(12) United States Patent
Zhu et al.

(10) Patent No.: US 9,707,620 B2
(45) Date of Patent: Jul. 18, 2017

(54) OPEN-TYPE SIDE-MOLD WATER SPOT-COOLING DEVICE, MANUFACTURING METHOD THEREOF AND METHOD FOR COOLING A CASTING MOLD

(71) Applicant: CITIC Dicastal CO., LTD, Qinhuangdao (CN)

(72) Inventors: Lin Zhu, Qinhuangdao (CN);
Changhai Li, Qinhuangdao (CN);
Hongbiao Li, Qinhuangdao (CN);
Fengyi Chang, Qinhuangdao (CN);
Yongning Wang, Qinhuangdao (CN);
Zhihua Zhu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 26 days.

(21) Appl. No.: 14/993,390

(22) Filed: Jan. 12, 2016

(65) Prior Publication Data
US 2016/0199908 A1    Jul. 14, 2016

(30) Foreign Application Priority Data
Jan. 12, 2015  (CN) .......................... 2015 1 0011624

(51) Int. Cl.
*B22C 9/06* (2006.01)
*B22D 18/04* (2006.01)
*B22D 30/00* (2006.01)
*B22C 9/28* (2006.01)
*B23P 15/26* (2006.01)

(52) U.S. Cl.
CPC .............. *B22D 30/00* (2013.01); *B22C 9/065* (2013.01); *B22C 9/28* (2013.01); *B22D 18/04* (2013.01); *B23P 15/26* (2013.01)

(58) Field of Classification Search
CPC ............ B22C 9/065; B22C 9/28; B22D 18/04
See application file for complete search history.

(56) References Cited

FOREIGN PATENT DOCUMENTS

| CN | 202224628 U | * | 5/2012 |
| JP | 04138840 A | * | 5/1992 |
| JP | 2002239684 A | * | 8/2002 |

* cited by examiner

*Primary Examiner* — Kevin E Yoon
(74) *Attorney, Agent, or Firm* — Maier & Maier, PLLC

(57) ABSTRACT

The present invention provides a side-mold water spot-cooling device for cooling a casting mold, a manufacturing method thereof and a method for cooling a casting mold by the device. The technical solution of the present invention has the following technical effects: an open-type backwater structure is employed, not only eliminating the back pressure from the backwater process without adding the supercharging equipment, but also reducing the investment costs of the equipment; reducing requirements for the sealing elements, thereby reducing costs for fittings; greatly reducing use of the joints and reducing the manufacturing, maintenance difficulty and costs of the mold; and the structure is substantially the same as that of the air-cooled mold and is easy for promotion.

8 Claims, 5 Drawing Sheets

OPEN-TYPE SIDE-MOLD WATER SPOT-COOLING DEVICE, MANUFACTURING METHOD THEREOF AND METHOD FOR COOLING A CASTING MOLD

TECHNICAL FIELD

The present invention relates to the casting field, and in particular to a side-mold water spot-cooling device employing an open-type backwater design.

BACKGROUND ART

In the field of low pressure casting of aluminum wheels, the water-cooled mold has attracted attention of numerous aluminum wheel manufacturers for its unique advantages In recent years, enterprises have been increasingly developing the forms or devices for practicing spot-cooling function besides doing research on the traditional annular water-cooling form. However, the spot-cooling device employing a closed backwater structure can easily cause difficulty in water inlet and unstable water flows because of the overlarge backpressure from the backwater process, thus affecting the cooling effect. A typical solution for solving this problem is to add a supercharging equipment to raise the water entry pressure of the equipment, which would inevitably increase investment costs on the equipment. Thus, how to solve the backpressure from the backwater process without increasing the costs of investment becomes a pressing problem.

The present invention is to provide a side-mold water spot-cooling device which can eliminate the backpressure from the backwater without increasing the investment costs.

SUMMARY OF THE INVENTION

The present invention relates to a side-mold water spot-cooling device employing an open-type backwater design, the device can eliminate the backpressure from the backwater process and can be widely used in side-mold spot-cooling of the low pressure casted water-cooled mold of the aluminum wheels, and application of the device is not restricted by the product structure.

In order to solve the technical problems mentioned above and to provide a spot-cooling device for practicing side-mold water spot-cooling and eliminating backpressure from backwater, the present invention provides the following technical solutions.

In one aspect of the present invention, a side-mold water spot-cooling device for cooling a casting mold is provided, characterized in that: (1) the device comprises a spot-cooling device body 2 which is a groove-like structure with the top open and an impounding reservoir 11 is defined in the groove-like structure; (2) the first side of the spot-cooling device body 2 in the length direction is a mold direction side, a through hole 10 and a through hole 13 used for securing the device to the mold via screws are opened in the mold direction; (3) the other side of the spot-cooling device body 2 in the length direction is a water outlet direction side on which a through hole 8, and a backwater port 9 located below the through hole 8 are opened; (4) the device further comprises a water inlet main pipe 3, a water pipe 12 and a water inlet branch pipe 14; the water inlet main pipe 3 is connected with the water pipe 12, and the water pipe 12 is connected with the water inlet branch pipe 14; the water inlet main pipe 3 and the water pipe 12 are installed on the top of a sidewall of the spot-cooling device body 2 in the water outlet direction side; the water inlet branch pipe 14 passes through the through hole 10, and the outer diameter of the water inlet branch pipe 14 is smaller than the inner diameter of the through hole 10; preferably, the water pipe 12 is fixed on the spot-cooling device body 2 through a water pipe depression bar 1 and a screw 4; (5) the through hole 8 is sealed by a pipe plug 5, preferably a red copper sealing point 6 is included on the installing surface of the pipe plug 5; and (6) a nipple joint 7 is installed outside of the spot-cooling device body 2 by a backwater port 9; preferably, the wall top of the mold direction side is below that of the water outlet direction side, and the center line of the through hole 10 is below the axis of the water pipe 12.

In a preferred aspect of the present invention, the inner diameter of the water inlet main pipe 3 is greater than or equal to twice of that of the water inlet branch pipe 14; preferably, the inner diameter of the water inlet main pipe 3 is twice to 6 times of that of the water inlet branch pipe 14; and more preferably, the inner diameter of the water inlet main pipe 3 is twice to 4 times of that of the water inlet branch pipe 14.

In a preferred aspect of the present invention, the inner diameter of the water pipe 12 is greater than or equal to that of the water inlet main pipe 3; preferably, the inner diameter of the water pipe 12 is 1 to 3 times of that of the water inlet main pipe 3; and more preferably, the inner diameter of the water pipe 12 is 1 to 1.5 times of that of the water inlet main pipe 3.

In a preferred aspect of the present invention, the inner diameter of the backwater port 9 is greater than or equal to twice of that of the water inlet branch pipe 14; preferably, the inner diameter of the backwater port 9 is twice to 6 times of that of the water inlet branch pipe 14; and more preferably, the inner diameter of the backwater port 9 is twice to 4 times of that of the water inlet branch pipe 14.

In a preferred aspect of the present invention, the water inlet main pipe 3, the water pipe 12 and the water inlet branch pipe 14 are all stainless steel pipes.

In a preferred aspect of the present invention, the through hole 8 and the through hole 9 are processed into straight-through fine threads.

In another aspect of the present invention, a method of manufacturing the aforementioned device is provided, characterized in that the method comprises the following steps: (1) processing the aforementioned spot-cooling device body 2, and processing the through hole 8 and through hole 9 into straight-through fine threads; (2) bending the water inlet branch pipe 14 at an angle of 90 degrees twice; (3) connecting the water inlet main pipe 3, the water pipe 12 and the water inlet branch pipe 14 together through welding, then installing the same on the spot-cooling device body 2, installing the water pipe depression bar 1 on the water pipe 12 and fixing the same on the spot-cooling device body 2 through a screw 4; (4) fixing the spot-cooling device body 2 on the side mold by screws through a through hole 13 and tightening the screws through the through hole 8; (5) installing a pipe plug 5 on the through hole 8 and adding a red copper sealing gasket 6 on the fitting surface; and (6) installing the nipple joint 7 into the through hole 9.

In another aspect of the present invention, a method of cooling a casting mold is provided, characterized in that the method comprises the following steps: (1) processing blind holes on the side edge of the casting mold; (2) installing the aforementioned device on the side edge of the casting mold and enabling the water inlet branch pipe 14 to extend into the blind holes; (3) fixing the aforementioned device on the side edge of the casting mold and installing a water outlet pipe on the nipple joint 7; and (4) introducing water with a pressure of 0.4-0.6 atm and a temperature of 25-35° C. into the water inlet main pipe 3 for a duration of 80-200 s.

In other aspects of the present invention, the following technical solution is provided: an open-type backwater side-mold water spot-cooling device, comprising a spot-cooling device body 2, a water inlet waterway system and a backwater waterway system, characterized in that the spot-cooling device body 2 is a metal block with a impounding function; the water inlet waterway system is composed of a water inlet main pipe 3, a water pipe 12 and a water inlet branch pipe 14; and the backwater waterway system is composed of a through hole 10, an impounding reservoir 11, a through hole 9 and a nipple joint 7.

The aforementioned open-type backwater side-mold water spot-cooling device is characterized in that the water inlet waterway system is fixed on the spot-cooling device body 2 through a water pipe depression bar 1 and a screw 4.

The aforementioned open-type backwater side-mold water spot-cooling device is characterized in that the through hole 8 and the through hole 9 employ the straight-through fine threads, the through hole 8 is sealed by utilizing the pipe plug 5 and the red copper sealing gasket 6, and a pair of nipple joints 7 are installed at the through hole 9 for connection of the backwater system of the equipment.

In other aspects of the present invention, the following technical solution is provided: an open-type backwater side-mold water spot-cooling device, comprising a spot-cooling device body 2, a water inlet waterway system and a backwater waterway system. The water inlet main pipe 3, the water pipe 12 and the water inlet branch pipe 14 are connected as a whole through welding to form the water inlet waterway system which is installed on the spot-cooling device body 2 and is fixed through the water pipe depression bar 1 and the screw 4. The water inlet branch pipe 14 is applied to the cooling hole of the side mold through a through hole 10. The spot-cooling device body 2 is fixed on the side mold via the screw through a through hole 13. The tool for securing the screw passes through the through hole 8 which is sealed with the pipe plug 5, a red copper sealing point 6 is added on the installing surface of the pipe plug 5 to enhance the sealing effect.

The backwater waterway system is composed of a through hole 10, an impounding reservoir 11, and a backwater port 9. The backwater flows into the impounding reservoir 11 from the through hole 10 for impounding and then flows into the backwater system through the backwater port 9.

The backwater port 9 is connected to the backwater system of the equipment by utilizing the nipple joint 7. The inner diameter of the water inlet main pipe 3 is greater than or equal to twice of that of the water inlet branch pipe 14. The inner diameter of the water pipe 12 is greater than or equal to that of the water inlet main pipe 3. The diameter of the backwater port 9 is greater than or equal to twice of that of the water inlet branch pipe 14. The water inlet main pipe 3, the water pipe 12 and the water inlet branch pipe 14 are all stainless steel pipes. The through hole 8 and the through hole 9 are processed into the straight-through fine threads.

In other aspects of the present invention, a method of manufacturing the aforementioned device is further provided:

an open-type backwater side-mold water spot-cooling device, comprising a water pipe depression bar 1, a spot-cooling device body 2, a water inlet main pipe 3, a water pipe 12 and a water inlet branch pipe 14. First, the water inlet branch pipe 14 is bent at an angle of 90 degrees twice; and then, the water inlet main pipe 3, the water pipe 12 and the water inlet branch pipe 14 are connected together through welding, and then are installed on the spot-cooling device body 2. A water pipe depression bar 1 is installed and fixed on the spot-cooling device body 2 through a screw 4. The spot-cooling device body 2 is fixed on the side mold by suitable screws through a through hole 13. The screws are tightened with a tool through the through hole 8. The through hole 8 and the through hole 9 are processed into the straight-through fine threads. A pipe plug 5 is installed on the through hole 8 and a red copper sealing gasket 6 is added on the fitting surface.

The nipple joint 7 is installed in the through hole 9.

The technical solution of the present invention has the following technical effects:

(1) employing the open-type backwater structure, not only eliminating the back pressure from the backwater process without adding the supercharging equipments, but also reducing the investment costs of the equipments;

(2) reducing requirements for the sealing elements, thereby reducing costs for fittings.

(3) greatly reducing use of joints and reducing the manufacturing, maintenance difficulty and costs of the mold; and (4) the structure is substantially the same as that of the air-cooled mold and is easy for promotion.

BRIEF DESCRIPTION OF THE DRAWINGS

Embodiments of the present invention will be described in detail below with reference to the accompany drawings, wherein:

FIG. 3 is a schematic top view of the open-type backwater side-mold water spot-cooling device of the present invention, wherein

DETAILED DESCRIPTION OF THE INVENTION

Embodiment 1

Figure 1:
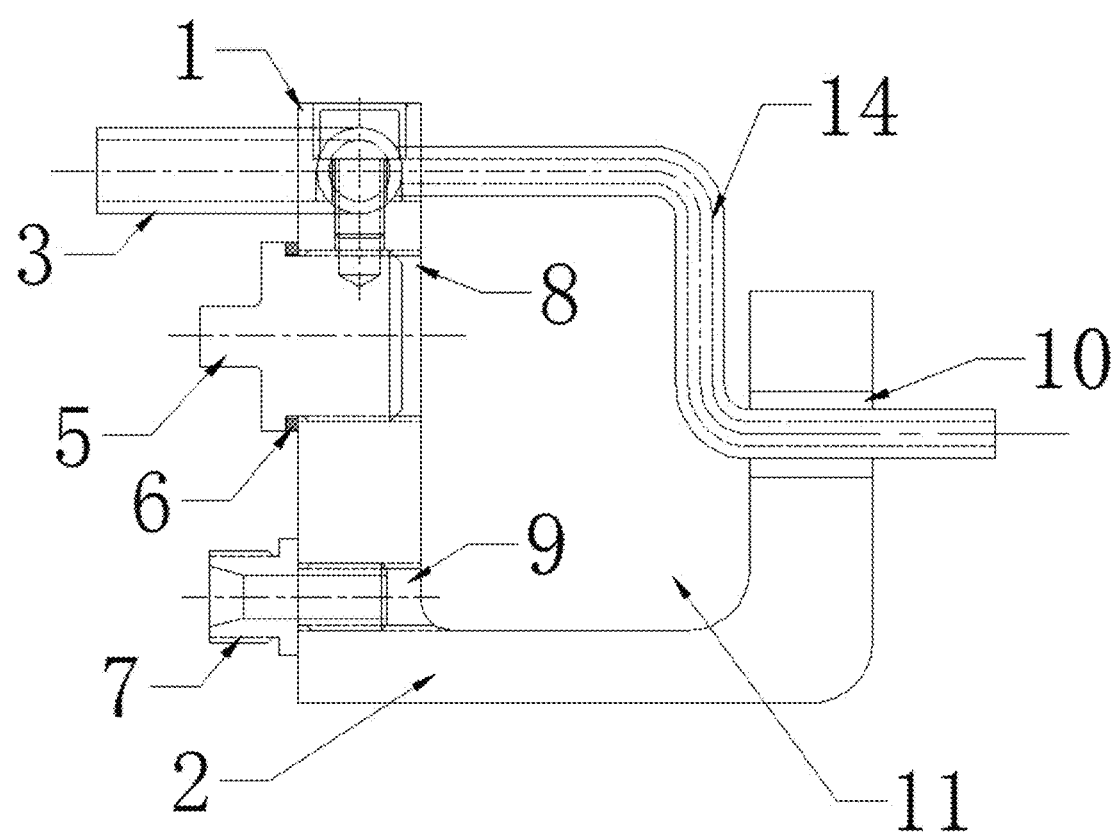
FIG. 1 is a schematic front view of the open-type backwater side-mold water spot-cooling device of the present invention, wherein: 1—water pipe depression bar, 2—spot-cooling device body, 3—water inlet main pipe, 4—tightening screw, 5—pipe plug, 6—red copper sealing gasket, 7—nipple joint, 8—through hole, 9—backwater port, 10—through hole, 11—impounding reservoir, 12—water pipe, 13—through hole, 14—water inlet branch pipe.
Figure 2:
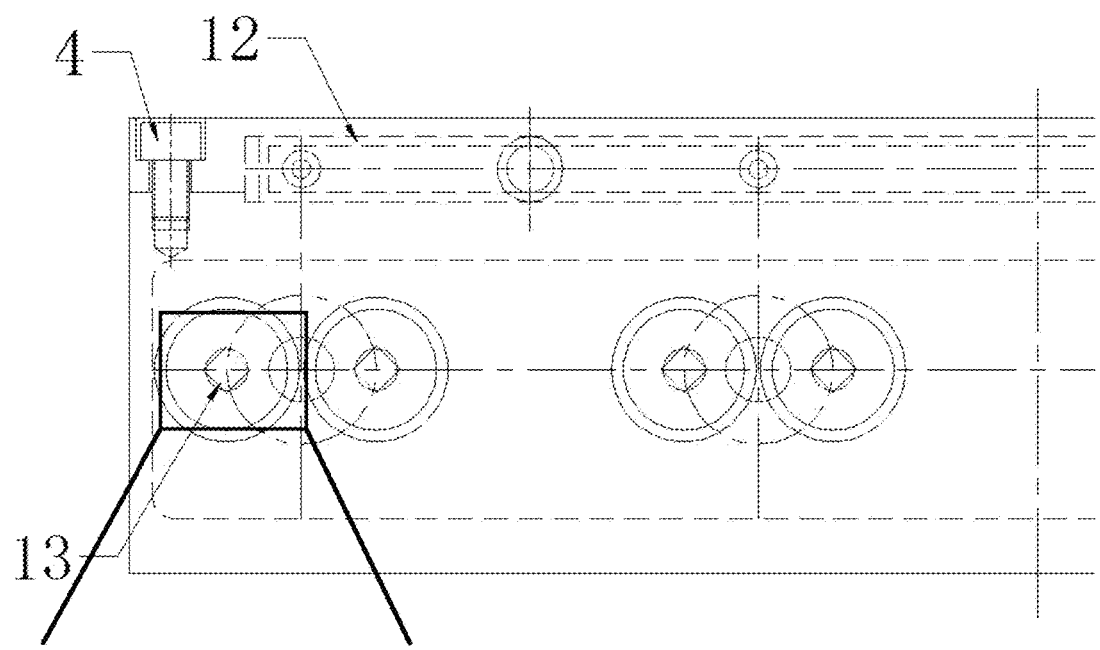
FIG. 2 is a part of a schematic left view of the open-type backwater side-mold water spot-cooling device of the present invention, wherein: 9—backwater port, 4—securing screw, 12—water pipe, 13—through hole.
Figure 3A:
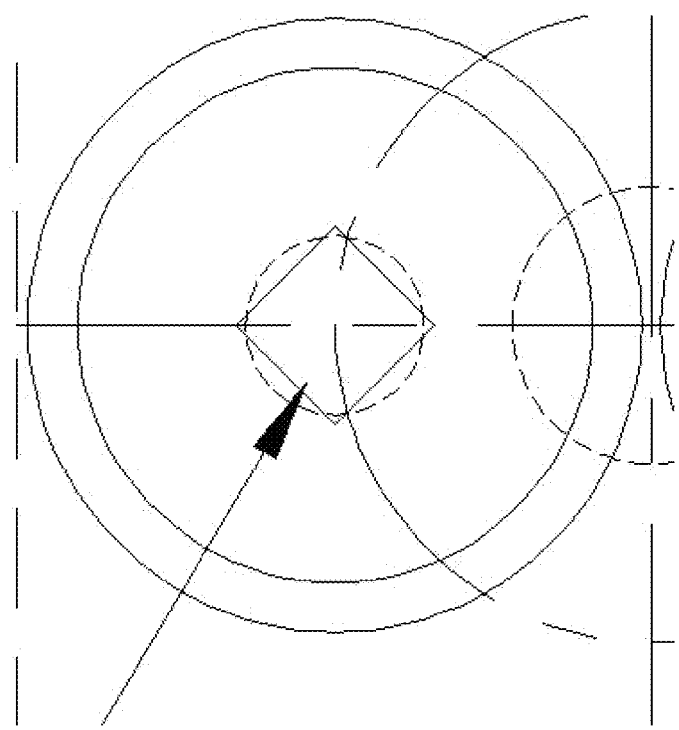
FIG. 3A is a partial enlarged schematic view showing at the through hole 8.
Figure 3B:
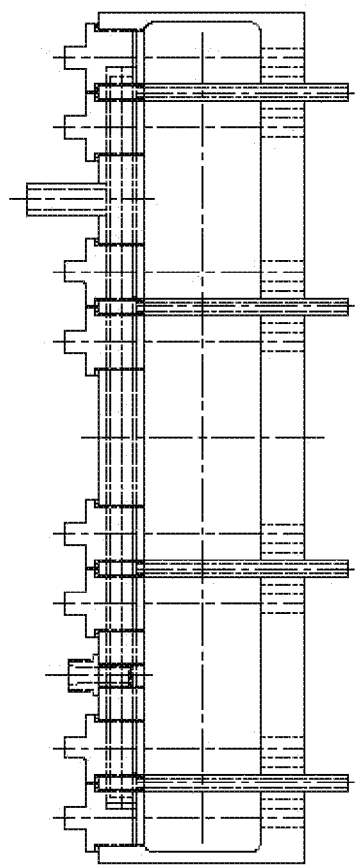
FIG. 3B is a top view.
Figure 4:
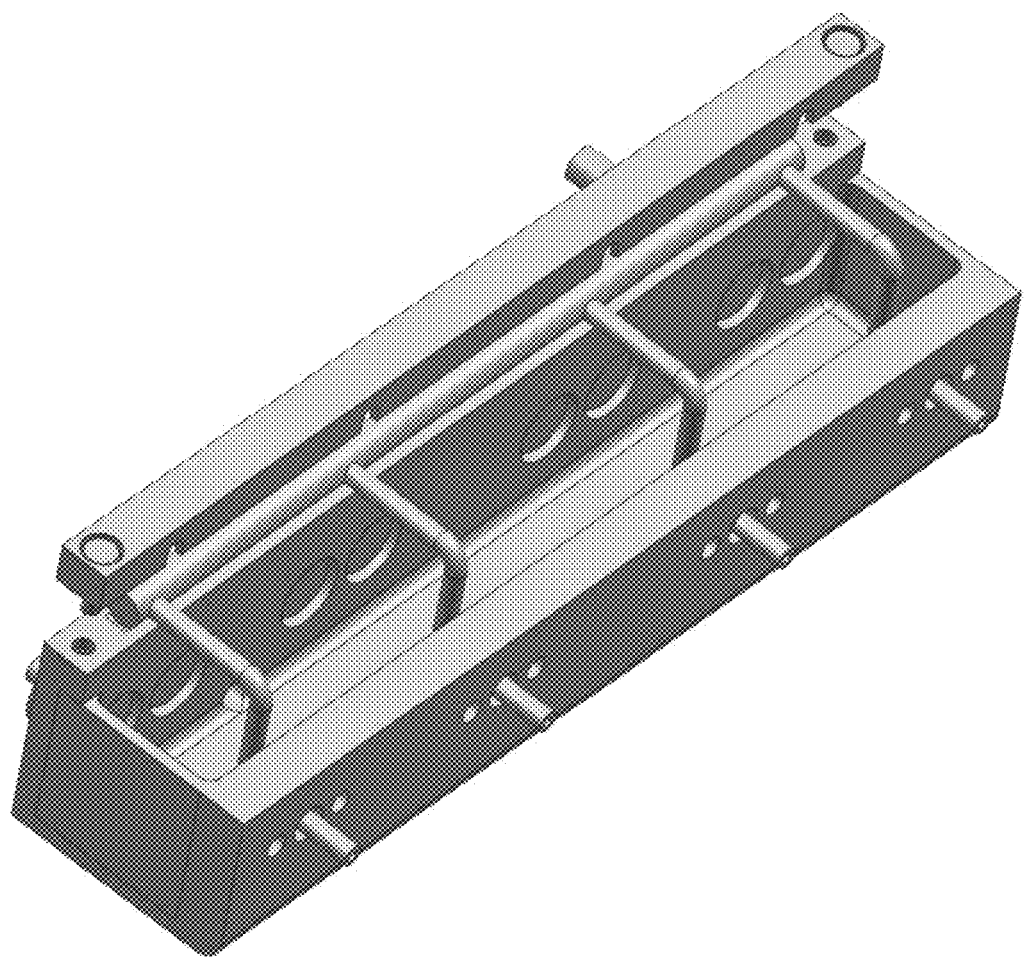
FIG. 4 is a 3D model schematic view of the open-type backwater side-mold water spot-cooling device of the present invention.
Figure 5:
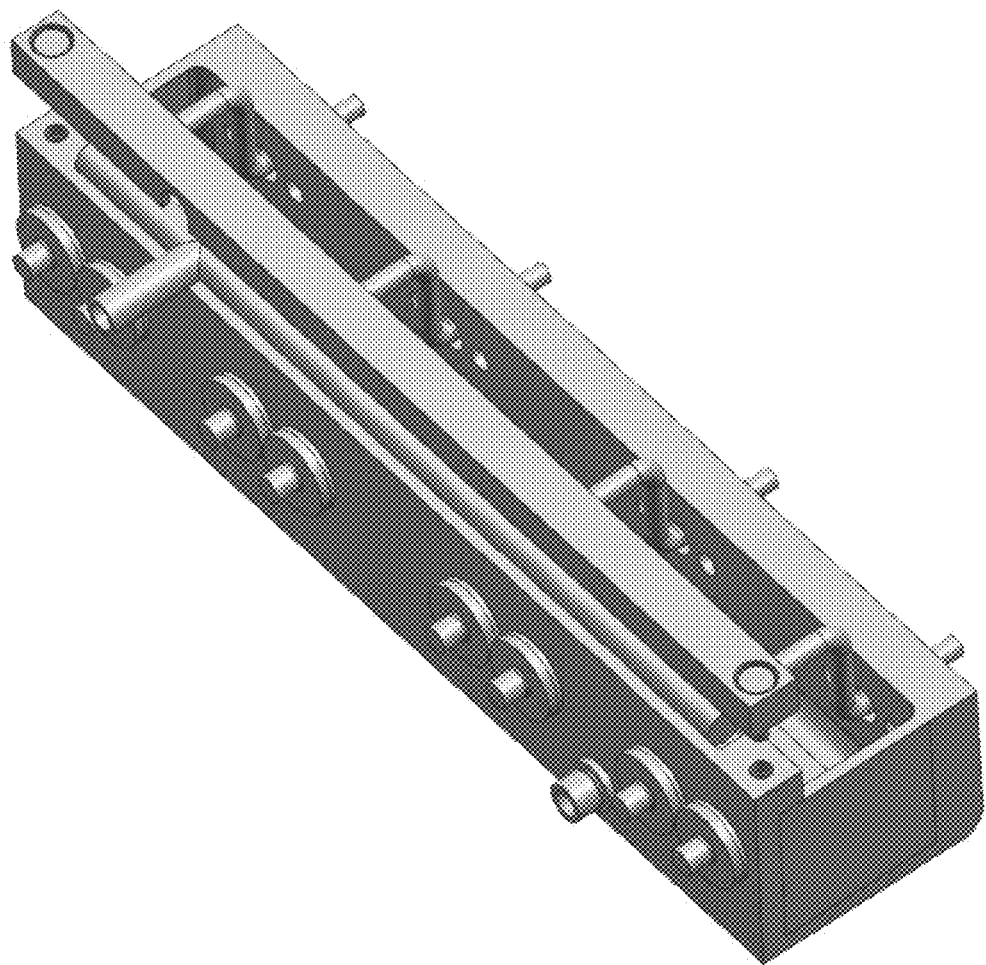
FIG. 5 is a 3D model schematic view of the open-type backwater side-mold water spot-cooling device of the present invention.

Manufacturing of the Side-Mold Water Spot-Cooling Device

The side-mold water spot-cooling device is manufactured according to the following method:

(1) processing the spot-cooling device body 2 according to claim 1, and processing the through hole 8 and the through hole 9 into straight-through fine threads; (2)

bending the water inlet branch pipe 14 at an angle of 90 degrees twice; (3) connecting the water inlet main pipe 3, the water pipe 12 and the water inlet branch pipe 14 together through welding, then installing them on the spot-cooling device body 2, installing the water pipe depression bar 1 on the water pipe 12 and fixing the same on the spot-cooling device body 2 via screws 4; (4) fixing the spot-cooling device body 2 on the side mold via the screws through a through hole 13 and tightening the screws through the through hole 8; (5) installing a pipe plug 5 on the through hole 8 and adding a red copper sealing gasket 6 on the fitting surface; and (6) installing the nipple joint 7 into the through hole 9.

The side-mold water spot-cooling device manufactured in embodiment 1 spends 12 man-hours and the manufacturing cost is 2,000 RMB. Compared with the other types of side-mold water spot-cooling devices on the market, 25% of man-hours and at least 50% of manufacturing cost are saved.

Embodiment 2

Cooling Effect of the Side-Mold Water Spot-Cooling Device

The side-mold water spot-cooling device manufactured in embodiment 1 is installed according to the following methods:
(1) processing blind holes on the side of the casting mold, wherein the casting mold is of 35CrMo material, which is purchased from the Nanhai Superband;
(2) installing the side-mold water spot-cooling device manufactured in embodiment 1 on the side edge of the casting mold and enabling the water inlet branch pipe 14 to extend into the blind holes; and
(3) fixing the side-mold water spot-cooling device manufactured in embodiment 1 on the side edge of the casting mold via screws and installing a water outlet pipe on the nipple joint 7.

Thermocouples are installed at a hot spot position of the mold to measure the mold temperature.

Then water with a pressure of 0.4 atm and a temperature of 25° C. is introduced into the water inlet main pipe 3 for a duration of 90 s. The measured data are as follows: before water cooling, the temperature of the mold measuring point A: 460° C. after water cooling for 1.5 min, the temperature of the mold measuring point A: 350° C.

In view of the above, the side-mold water spot-cooling device manufactured by embodiment 1 can achieve excellent cooling effects.

The invention claimed is:

1. A side-mold water spot-cooling device for cooling a casting mold, comprising:
a spot-cooling device body which is a groove-like structure with a top open and an impounding reservoir defined in the groove-like structure;
a first side of the spot-cooling device body in a length direction is a mold direction side, a first through hole and a second through hole used for securing the device to the mold via screws are opened in the mold direction side;
the other side of the spot-cooling device body in the length direction is a water outlet direction side on which a third through hole, and a backwater port located below the third through hole are opened;
the device further comprises a water inlet main pipe, a water pipe and a water inlet branch pipe; the water inlet main pipe is connected with the water pipe, and the water pipe is connected with the water inlet branch pipe; the water inlet main pipe and the water pipe are installed on the top of a sidewall of the spot-cooling device body in the water outlet direction side; the water inlet branch pipe passes through the first through hole, and the outer diameter of the water inlet branch pipe is smaller than the inner diameter of the first through hole; wherein, the water pipe is fixed on the spot-cooling device body through a water pipe depression bar and a screw third;
the through hole is sealed by a pipe plug, wherein a red copper sealing point is included on an installing surface of the pipe plug; and
a nipple joint is installed outside the spot-cooling device body by the backwater port; wherein, the wall top of the mold direction side is below that of the water outlet direction side, and the center line of the first through hole is below the axis of the water pipe.

2. The device according to claim 1, wherein the inner diameter of the water inlet main pipe is greater than or equal to twice of that of the water inlet branch pipe.

3. The device according to claim 1, wherein the inner diameter of the water pipe is greater than or equal to that of the water inlet main pipe.

4. The device according to claim 1, wherein the inner diameter of the backwater port is greater than or equal to at least twice of that of the water inlet branch pipe.

5. The device according to claim 1, wherein the water inlet main pipe, the water pipe and the water inlet branch pipe are all stainless steel pipes.

6. The device according to claim 1, wherein the third through hole and the backwater port are processed into straight-through fine threads.

7. A method for manufacturing the device according to claim 1, comprising:
processing the spot-cooling device body according to claim 1, third through hole and a backwater port into straight-through fine threads;
bending a water inlet branch pipe at an angle of 90 degrees twice;
connecting a water inlet main pipe, a water pipe and a water inlet branch pipe together through welding, then installing the same on the spot-cooling device body, installing a water pipe depression bar on the water pipe and fixing the same on the spot-cooling device body through a screw;
fixing the spot-cooling device body on the side mold via the screws through a second through hole and tightening the screws through the through hole;
installing a pipe plug on the third through hole and adding a red copper sealing gasket on the fitting surface; and
installing a nipple joint into the backwater port.

8. A method of cooling a casting mold, comprising:
processing blind holes on a side edge of the casting mold;
installing the device according to claim 1 on the side edge of the casting mold and enabling the water inlet branch pipe to extend into the blind holes;
fixing the device according to claim 1 on the side edge of the casting mold via screws and installing a water outlet pipe on the nipple joint; and
introducing water with a pressure of 0.3-0.6 atm and a temperature of 25-35° C. into the water inlet main pipe for a duration of 70-180 s.

* * * * *